Oct. 13, 1953     T. BROWN     2,655,410
WHEEL AND AXLE ASSEMBLY FOR VARIABLE TREAD VEHICLES
Filed Nov. 12, 1949
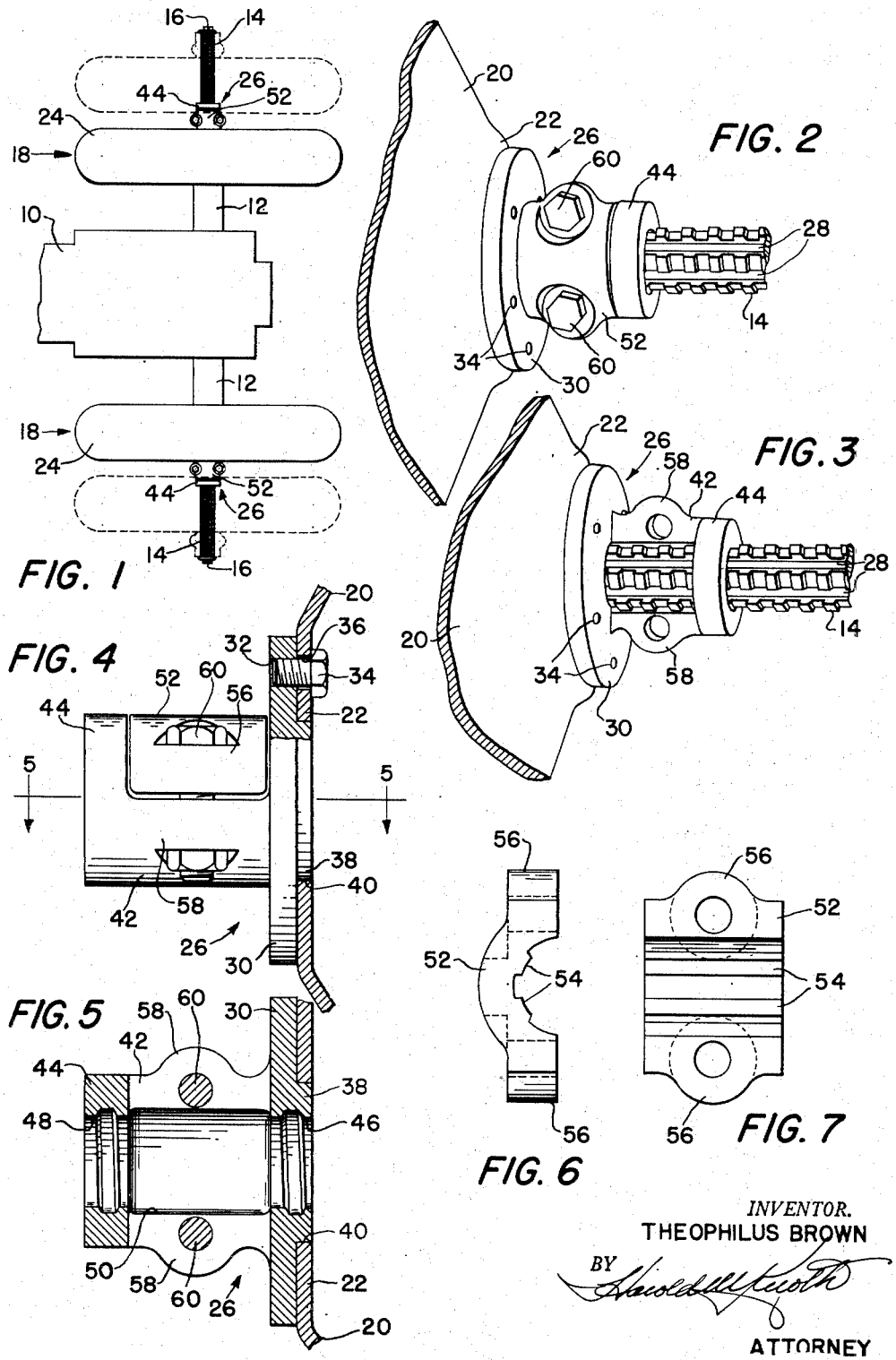
INVENTOR.
THEOPHILUS BROWN
BY
ATTORNEY Patented Oct. 13, 1953

2,655,410

UNITED STATES PATENT OFFICE 2,655,410

WHEEL AND AXLE ASSEMBLY FOR VARIABLE TREAD VEHICLES

Theophilus Brown, Moline, Ill., assignor to Deere & Company, Moline, Ill., a corporation of Illinois Application November 12, 1949, Serial No. 126,822

3 Claims. (Cl. 301—1)

This invention relates to an adjustable wheel and axle assembly for accomplishing variation in tread or wheel spacing in agricultural tractors or like vehicles.

A typical agricultural tractor comprises a longitudinal narrow body having at its rear end laterally oppositely extending axle housings, each of which journals a relatively long axle on each of which is carried a traction wheel. In the conventional tractor, each axle is splined or provided with lengthwise keyways and the wheel has a cooperative hub provided with clamping means so that the wheel may be positioned on the axle in various positions of axial adjustment, thereby effecting variation in wheel spacing or tread. When the tractor is used in plowing, it is desirable that the wheels be relatively closely spaced together, whereas in a cultivating operation, it is desirable that the wheels be relatively widely spaced apart. Further tread variation is accomplished in most tractors by reversing of the traction wheels on the axles, the wheels having their hub portions axially offset from the median plane of the tire and rim for this purpose. In tractors of this type, tread variation is accomplished by jacking up the tractor as a preliminary step before the wheels can be axially shifted on the axles.

In the U. S. Patent 2,099,194 to Brown, there is disclosed and claimed a variable tread arrangement in which the axles and hubs are threaded, power from the tractor engine being utilized through the tractor differential for rotating the axles relative to the wheels to propel the wheels axially inwardly or outwardly. Releasable locking means is provided for normally securing the wheels to the axles for rotation therewith. In the later U. S. Patent 2,472,742 to Brown, there is provided an improvement in the locking means wherein the wheel hub is threaded to cooperate with the axle threads and a separate splined member cooperates with the axle splines and has means for releasably interconnecting the separate member and the hub to constrain the axle, member and hub for rotation together. The present invention relates to an improvement in means for releasably securing the wheel or hub to the axle and has for its principal object the provision of a simplified design comprising essentially a hub portion that provides a relatively wide bearing area on the axle, together with a removable cap which has splines therein cooperative with the axle splines. The removable member is secured to the hub by securing means including a pair of bolts. The improved construction is relatively simple and inexpensive and facilitates the adjustment of the wheels relative to the axle.

The foregoing and other important objects and desirable features inherent in and encompassed by the invention will become apparent as a preferred embodiment of the invention is fully disclosed in the following detailed description and accompanying sheet of drawings in which Figure 1 is a plan view of a rear portion of a tractor showing a narrow tread position of the traction wheels in full lines and a wide tread position of the traction wheels in dotted lines;

Figure 2 is an enlarged perspective view of the hub assembly;

Figure 3 is a similar perspective view with the removable cap taken off;

Figure 4 is an enlarged side elevational view, partly in section, of the hub assembly;

Figure 5 is a sectional view taken on the line 5—5 of Figure 4; and

Figures 6 and 7 are respectively end and bottom views of the removable cap.

The tractor chosen for the purposes of illustration comprises a longitudinal body 10 having at each side thereof a laterally outwardly extending housing 12 which journals a driving axle 14. Each axle is relatively elongated and has an outer end portion disposed at a position relatively remote from the proximate side of the tractor body 10. This outer end portion of each axle is provided with a stop 16, the purpose of which will presently appear. Each axle carries thereon a traction wheel designated generally by the numeral 18.

Each wheel includes a central wheel body 20 which is dished so that its central portion 22 is axially offset from the median plane of a pneumatic tire 24 carried by the wheel. The portion 22 is rigidly associated with a hub assembly, designated generally by the numeral 26, by means of which the wheel is mounted on the respective axle 14.

Each axle 14 is externally threaded throughout that portion thereof that projects laterally beyond the axle housing 12, as best illustrated in Figures 2 and 3. Each axle is further splined or otherwise provided with one or more keyways 28 running lengthwise thereof to the outer end and intersecting the threads.

The hub assembly 26 for each wheel comprises a main hub body in the form of a ring or flange 30 provided with a circle of tapped bores 32 (Figure 4) which receive a plurality of cap screws 34 passed through a circle of bolt openings 36 in the mounting portion 22 of the wheel body 20.

The ring or flange 30 has integrally formed thereon an annular shoulder 38 which is received in a central opening 40 in the wheel body portion 22 (Figure 4). The portion of the hub just described serves as means for carrying the wheel 18 on the hub assembly.

Each hub assembly further includes an axial extension 42 which is joined at its inner end to the ring 30 and which terminates at its outer end in a second and smaller hub portion or ring 44. The axial extension 42 is in the form of a semicircular element preferably formed integral respectively at its opposite ends with the rings 30 and 44. The semicircular element or extension 42 is thus adapted to embrace substantially one-half of that portion of the axle 14 intermediate the rings 30 and 44 when the hub assembly is mounted on the axle.

The ring 30 is internally threaded at 46 and the ring 44 is internally threaded at 48, these threaded portions mating with the threaded axle 14. The interiorly arcuate form of the semicircular extension or element 42 is undercut or formed arcuate on a larger radius, as at 50 in Figure 5. Thus, although the semicircular extension embraces the axle portion between the rings 44 and 30, bearing support for the hub on the axle is provided by the axially spaced threaded portions 46 and 48.

From the description thus far, it will be seen that each wheel 18 is, by means of its hub assembly 26, carried on the axle 14 for rotation relative to the axle selectively in opposite directions to effect axial adjustment of the wheel relative to the axle in one direction or the other depending upon the direction of rotation. Thus, axial shifting of the wheel is accomplished by rotation thereof relative to the axle. However, the invention in its broader aspects is not limited to a threaded axle but is just as readily adapted to an axle having only lengthwise splines or keyways.

Any selected position of a wheel 18 on its axle 14 may be secured, according to the present invention, by means including a removable cap or member 52 which, as best shown in Figure 6, is semicircular in form to complement the semicircular axial extension 42. The length of the cap 52 is slightly less than the axial spacing between the proximate faces of the rings 30 and 44. Thus, the cap 52 is accommodated in the space or opening provided between the rings because of the semicircular shape of the extension or element 42. Further, the cap 52 occupies this space and thus embraces the exposed portion of the axle diametrically opposed to that portion of the axle enclosed or embraced by the semicircular extension 42. The cap is provided with an arcuately formed interior and is provided with internal splines or key means 54 which fit or engage the splines 28 of that portion of the axle exposed between the rings 30 and 44.

The cap 52 is provided with a pair of apertured diametrical portions or ears 56 which provide part of means for securely though removably clamping the cap 52 to the axial extension or semicircular element 42. The securing means further includes diametrically opposed apertured portions or ears 58 on the element 42. Bolts 60 are passed through the cooperating apertured ears 56—58 at diametrically opposite sides of the axle and complete the securing means.

Each wheel 18 may be freed for rotation relative to the axle by removal of its cap 52. The axial position of the wheel may be selected and the cap reassembled by means of the bolts 60. When the bolts are drawn up tight, the cap 52 is securely clamped in place and the axle and hub assembly are constrained for rotation together. The stop 16 at the outer end of the axle prevents the wheel from being accidentally run off the axle. This stop may be removed when it is desired to remove the wheel completely from the axle.

Various features and objects of the invention not specifically enumerated herein will undoubtedly occur to those versed in the art, as likewise will numerous modifications and alterations in the preferred embodiment of the invention herein disclosed, all of which may be achieved without departing from the spirit and scope of the invention as defined in the appended claims.

What is claimed is:

1. A wheel and axle assembly for use in obtaining wheel tread variation in agricultural tractors or the like, comprising: an elongated, externally threaded axle having an outer end and provided with a keyway running lengthwise thereof and intersecting the threads; a wheel on the axle including a hub having a main body portion including a central, internally threaded aperture therein mating with the threads on the axle so that rotation of the wheel selectively in opposite directions relative to the axle effects axial adjustment of the wheel toward or away from the outer end of the axle, said hub having an axial extension rigid with the body portion and terminating in a rigidly related ring having internal threads mating with the axle threads in axially spaced relation to the hub body portion, said axle extension being formed with an opening between the hub body portion and said ring for exposing a circumferential portion of the axle, said extension further having rigid thereon a pair of apertured connecting portions spaced apart transverse to the axle so as to lie one at each side of the opening; a cap receivable by the axial extension in said opening and having an interiorly arcuate formation shaped to conform to and embrace said exposed portion of the axle and provided with key means engaging that part of the axle keyway exposed through said opening, said cap having rigid thereon a pair of apertured connecting portions spaced apart according to the spacing of and respectively in registry with the connecting portions on the axial extension; and securing means cooperative between the cap and hub, including a pair of securing elements passed respectively through the registered connecting portions of the cap and the axial extension, for rigidly though removably clamping the cap in place so that the wheel, cap and axle are constrained to rotate together.

2. For use in obtaining tread variation in an agricultural tractor of the type having a transversely extending, elongated axle provided with external threads and with a keyway running lengthwise thereof and intersecting the threads; a wheel hub assembly, comprising a hub including a body having external means thereon to carry a wheel and including a central aperture internally threaded to mate with the threaded axle; a coaxial rigid extension on the hub body terminating in a ring spaced axially from the hub body and having internal threads for mating with the axle threads, said extension being formed with an opening at one side thereof to expose a circumferential portion of the axle between the hub body and ring, said extension further having rigid thereon a pair of apertured connecting portions spaced apart transverse to the axle so as to lie one at each side of the opening; a cap receivable by the axial extension in said opening and having an interiorly arcuate formation shaped to conform to and embrace the portion of the axle exposed through the opening and provided with internal key means engageable with that portion of the axle keyway exposed through the opening, said cap having rigid thereon a pair of apertured connecting portions spaced apart according to the spacing of and respectively in registry with the connecting portions on the axial extension; and means cooperative between the cap and hub, including a pair of securing elements passed respectively through the registered connecting portions of the cap and the axial extension, for rigidly though removably clamping the cap in place so that the hub, cap and axle are constrained to rotate together.

3. In combination, an axle having a threaded end and a longitudinal groove in said axle end, a wheel hub threaded onto said axle end and having an end flange for attachment of a wheel to one side thereof, said hub having an opening therein on the other side of said flange extending longitudinally along said axle end and terminating on said other side of said flange, a substantially semi-cylindrical closure plate for said opening fitting therein against said axle end and detachably attached to said hub, and means on said plate fitting in said groove to lock said hub to said axle end.

THEOPHILUS BROWN.

References Cited in the file of this patent

UNITED STATES PATENTS

| Number | Name | Date |
|---|---|---|
| 2,099,194 | Brown | Nov. 16, 1937 |
| 2,235,457 | Lorimor | Mar. 18, 1941 |
| 2,302,570 | Peterson | Nov. 17, 1942 |
| 2,324,681 | Dekker | June 20, 1943 |
| 2,472,742 | Brown | June 7, 1949 |